United States Patent
Dominguez (10) Patent No.: US 10,638,737 B2
(45) Date of Patent: May 5, 2020

(54) COLLAPSIBLE BAIT NET

(71) Applicant: Yunior Dominguez, Hialeah, FL (US)

(72) Inventor: Yunior Dominguez, Hialeah, FL (US)

( * ) Notice: Subject to any disclaimer, the term of this patent is extended or adjusted under 35 U.S.C. 154(b) by 0 days.

(21) Appl. No.: 16/197,722

(22) Filed: Nov. 21, 2018

(65) Prior Publication Data
US 2019/0090463 A1   Mar. 28, 2019

Related U.S. Application Data

(63) Continuation-in-part of application No. 15/434,063, filed on Feb. 16, 2017, now Pat. No. 10,165,764.

(51) Int. Cl.
*A01K 75/00* (2006.01)
*A01K 71/00* (2006.01)
*A01K 73/00* (2006.01)
*A01K 74/00* (2006.01)

(52) U.S. Cl.
CPC .............. *A01K 75/00* (2013.01); *A01K 71/00* (2013.01); *A01K 73/00* (2013.01); *A01K 74/00* (2013.01)

(58) Field of Classification Search
CPC ......... A01K 69/02; A01K 74/00; A01K 73/00
USPC .............................................................. 43/7
See application file for complete search history.

(56) References Cited

U.S. PATENT DOCUMENTS

| | | | | |
|---|---|---|---|---|
| 1,453,135 A * | 4/1923 | Hermanson | ............ | A01K 69/06 43/100 |
| 1,841,956 A * | 1/1932 | Juergens | ................ | A01K 97/20 43/55 |
| 2,767,501 A * | 10/1956 | Bjorksten | ............... | A01K 73/12 43/7 |
| 3,029,546 A * | 4/1962 | Ruiz | ....................... | A01K 69/06 43/105 |
| 3,300,890 A * | 1/1967 | Thomassen | ............ | A01K 69/10 43/100 |
| 3,314,187 A * | 4/1967 | Marcinkowski | ....... | A01K 69/10 43/105 |
| 3,484,981 A * | 12/1969 | Gilmer | .................... | A01K 73/12 43/105 |
| 3,688,433 A * | 9/1972 | Niskin | .................... | A01K 69/00 43/100 |

(Continued)

FOREIGN PATENT DOCUMENTS

| FR | 2788933 A1 * | 8/2000 | ............. A01K 73/00 |
|---|---|---|---|
| GB | 2082881 A * | 3/1982 | ............. A01K 77/00 |
| WO | WO-9500013 A1 * | 1/1995 | ............. A01K 77/00 |

*Primary Examiner* — Christopher P Ellis
(74) *Attorney, Agent, or Firm* — Calrie Marsh, Esq.

(57) ABSTRACT

The present invention is a hoop net comprised of netting mounted to two or more semicircular tubular rods, forming a ring that maintains its shape and structural integrity. The two semicircular tubular rods are fashioned to connect seamlessly by a fastening means that allows the entire assembly to function as intended. The hoop net assembly includes four stabilizing cords positioned equidistant from each other along the ring, which cords converge at the center of the hoop net assembly and are connected to each other by a fastening means, then further connected to a single draw cord. The draw cord is used to cast the assembled hoop net into water to a desired depth and pulled back into the boat with live bait. Once the hoop net assembly has been used, the metal rods are easily disconnected to facilitate folding the hoop net in half for easy storage and portability.

8 Claims, 9 Drawing Sheets

(56) References Cited

U.S. PATENT DOCUMENTS

| | | | | |
|---|---|---|---|---|
| 4,143,480 | A * | 3/1979 | Bott | A01K 69/10 43/105 |
| 4,305,219 | A * | 12/1981 | Ratliffe | A01K 69/06 220/904 |
| 4,607,448 | A * | 8/1986 | Brief | A01K 74/00 43/8 |
| 4,653,214 | A * | 3/1987 | Cline | A01K 77/00 43/11 |
| 5,478,273 | A * | 12/1995 | Ives | A01K 69/10 43/100 |
| 5,509,227 | A * | 4/1996 | Marrero | A01K 71/00 43/100 |
| 5,615,510 | A * | 4/1997 | Anderson | A01K 74/00 43/12 |
| 5,673,510 | A * | 10/1997 | Campbell | A01K 73/12 43/105 |
| 5,737,869 | A * | 4/1998 | Murguido | A01K 69/10 43/100 |
| 6,705,039 | B1 * | 3/2004 | Campbell | A01K 74/00 43/12 |
| 8,161,676 | B1 * | 4/2012 | Beach | A01K 74/00 43/7 |
| 2002/0139032 | A1 * | 10/2002 | Campbell | A01K 74/00 43/11 |
| 2003/0056420 | A1 * | 3/2003 | Yu | A01K 77/00 43/7 |
| 2004/0163302 | A1 * | 8/2004 | Hong | A01K 69/10 43/105 |
| 2008/0216388 | A1 * | 9/2008 | Thorsen | A01K 69/10 43/105 |
| 2013/0160352 | A1 * | 6/2013 | Hayes | A01K 69/10 43/105 |
| 2016/0205905 | A1 * | 7/2016 | Souther | A01K 74/00 |

* cited by examiner

COLLAPSIBLE BAIT NET

CONTINUATION-IN-PART

This application claims the benefit of prior filed application Ser. No. 15/434,063 under 37 CFR 1.53(b).

STATEMENT REGARDING FEDERALLY SPONSORED RESEARCH OR DEVELOPMENT

This invention has been created without the sponsorship or funding of any federally sponsored research or development program.

FIELD OF INVENTION

The present invention relates to generally to fishing bait nets and in particular to collapsible bait nets for easy storage and transport.

BACKGROUND

In the fishing industry, whether for sport or for profit, bait nets are used to capture small fish and/or sea creatures for use as bait to attract bigger fish such as marlin, tuna, tarpon or similar fish. The bait nets usually used by fishermen come in varying forms, sizes, and shapes, but invariable are too cumbersome to store and transport. In particular, the bait nets used to catch larger bait need to be sturdy and able to withstand the rigors of being cast into the ocean from a moving or stationary vessel, dragged through water, and pulled back into a boat. In instances where the bait net is sturdy enough to handle this rigorous activity, they are not easily stored on or off the boat or transportable from one venue to another. The rigid construct of most good bait nets results in rapid deterioration through sun exposure or tearing due to improper storage on a boat or in a garage or other location not suitable to protect the delicate netting.

The present invention solves these problems by providing a collapsible hoop net that is strong and sturdy to endure the rigors of capturing bait, and which is capable of being stored and transported with ease. The essential feature of this invention allows for the collapsing of the hoop net to be stored on the boat in a location that minimizes sun exposure and rapid deterioration. Alternatively, the collapsible/folded hoop net may be stored in another location or may be packaged in a protective casing.

SUMMARY OF THE INVENTION

The present invention serves to improve upon existing bait nets and address the storage and transport challenges facing the industry without sacrificing the strength and rigidity the bait net.

The present invention is a hoop net comprised of netting that is affixed or mounted to two or more semi-circular metal rods which when assembled appear to be one complete ring that maintains its shape and integrity. The two semi-circular metal rods are fashioned to connect seamlessly by a fastening means that allows the entire assembly to function as intended. Additionally, the position of the net about the semi-circular metal rods is designed to evenly distribute weight and improve the overall balance of the assembly. The net is affixed to the two semi-circular metal rods and extends in a conical shape, creating a hoop or enclosed receptacle for capturing and holding live bait as they are pulled from the water into a boat. Further, the hoop net and rod components of the invention also include four stabilizing cords positioned equidistant along the circumference of the connected metal rods, which cords converge at the center of the hoop by a fastening means to a single draw cord. The draw cord is used to cast or lower the assembled hoop net into the water to a desired depth and pull the hoop net back into the boat with bait. Once the hoop net assembly has been used, the metal rods are easily disconnected to facilitate folding the hoop net in half for easy storage in a bin on the boat or protective casing.

In another embodiment of the present invention, there are four metal rods that are seamlessly connected to form a complete circular rod to which the bait net is attached. This configuration allows the hoop net assembly to be collapsible into four components for easy storage in a bin on the boat or in a protective casing. In yet another embodiment of the invention, the hoop net consists of one continuous circular tubular rod that is a complete ring without any breaks or points of connection. The latter embodiment of the invention focuses on the rigidity of the tubular rod and is designed for users who do not have a storage or transport constraint.

BRIEF DESCRIPTION OF THE DRAWINGS

The accompanying drawings incorporated in and forming a part of the specification, illustrate several aspects of the present invention, and together with the description serve to explain the principles of the invention. In describing the invention, reference will at times be made to the accompanying drawings in which.

DESCRIPTION OF THE INVENTION

Before the subject invention is described further, it is to be understood that the invention is not limited to the particular embodiments of the invention described below, as variations of the particular embodiments may be made and still fall within the scope of the invention. It is also to be understood that the terminology employed is for the purpose of describing particular embodiments, and is not intended to be limiting.

The details of one or more embodiments of the invention are set forth in the accompanying drawings and the description below. Other features, objects, and advantages of the invention will be apparent from the description and drawings, and from the claims. In the following description, numerous specific details are set forth to provide a thorough understanding of the embodiments. One skilled in the art to which this invention belongs will recognize, however, that the techniques described can be practiced without one or more of the specific details, or with other methods, components, materials, etc. In other instances, well known structures, materials or operations are not shown or described in detail to avoid obscuring certain aspects.

In this specification, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs.

Figure 1A:
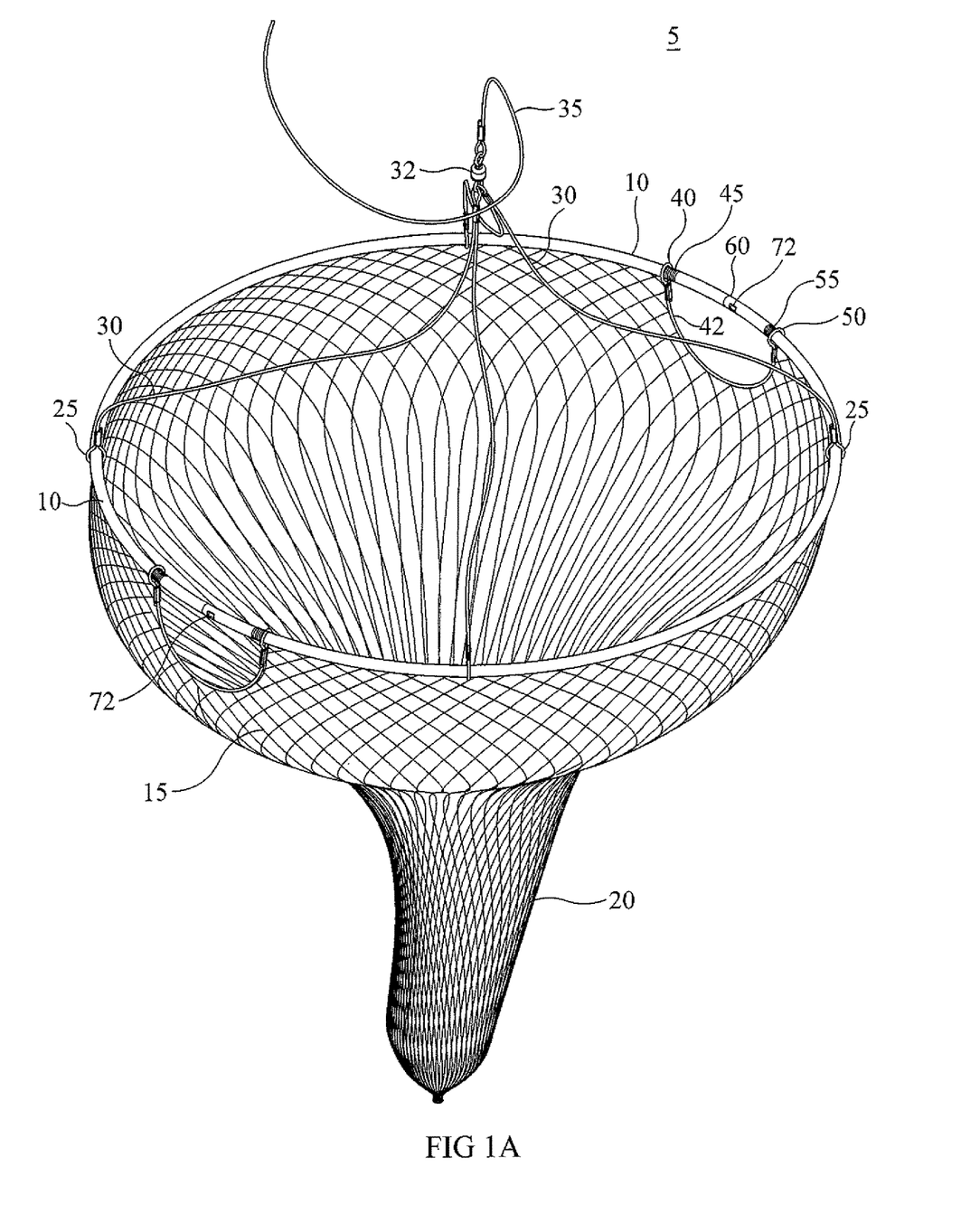
FIG. 1A is a top perspective view of the assembled components of the present invention.
Figure 1B:
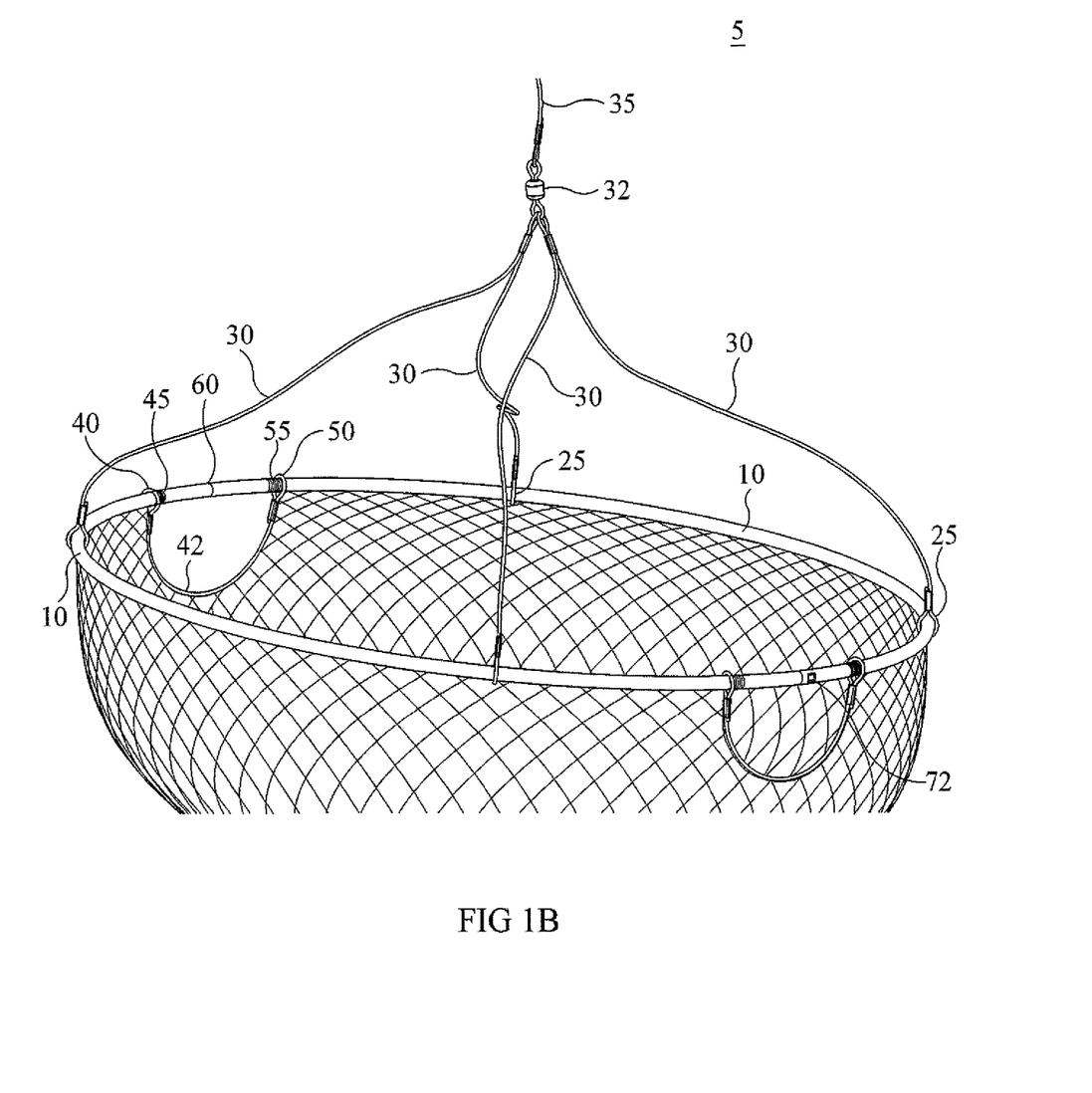
FIG. 1B is a side perspective view of the top portion of the assembled components of the present invention.

FIG. 1A is a top perspective view of the assembled components of the present invention, the hoop net 5, comprising two semicircular tubular metal rods 10 connected at seamless connection points 60 (the darkened area shown in the FIG. 1 is for illustrative purposes only); with a net 15 affixed or mounted to the tubular metal rods 10, which net extends into a conical shaped enclosed receptacle 20; and four stabilizing cords 30 positioned equidistant along the circumference of the connected metal rods 10 and which cords converge at the center of the hoop net 5 by a fastening means 32 and to a single draw cord 35. The net 15 is connected to the metal rods 10 at points of connection 40 and 50 via a U shaped cord 42 that creates an opening which serves to facilitate the point of connection and disconnection of the metal rods 10. The net 15 is further mounted in an interwoven pattern about the circumference of the connected metal rods 10. On each interior side of the points of connection 40 and 50 for the net 15 is a thin layer of waterproof tape 45 and 55 which keeps the net 15 in place about the seamless connection point(s) 60. The four stabilizing cords 30 are positioned at equidistant points 25 along the circumference of the connected metal rods 10. These features of the invention are further illustrated in FIG. 1A.

Figure 2A:
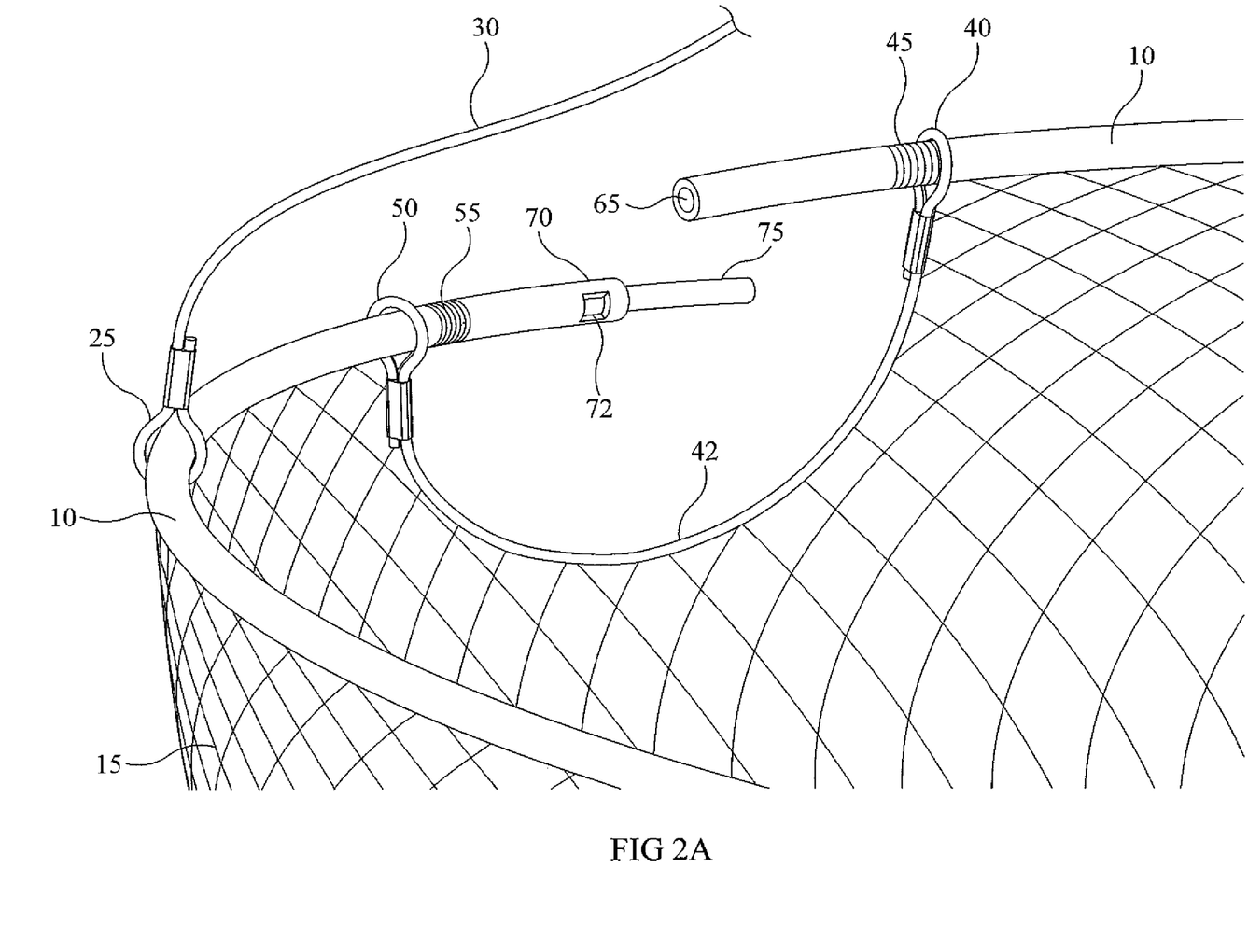
FIG. 2A is an enlarged top perspective view of the partially assembled components of the present invention.
Figure 2B:
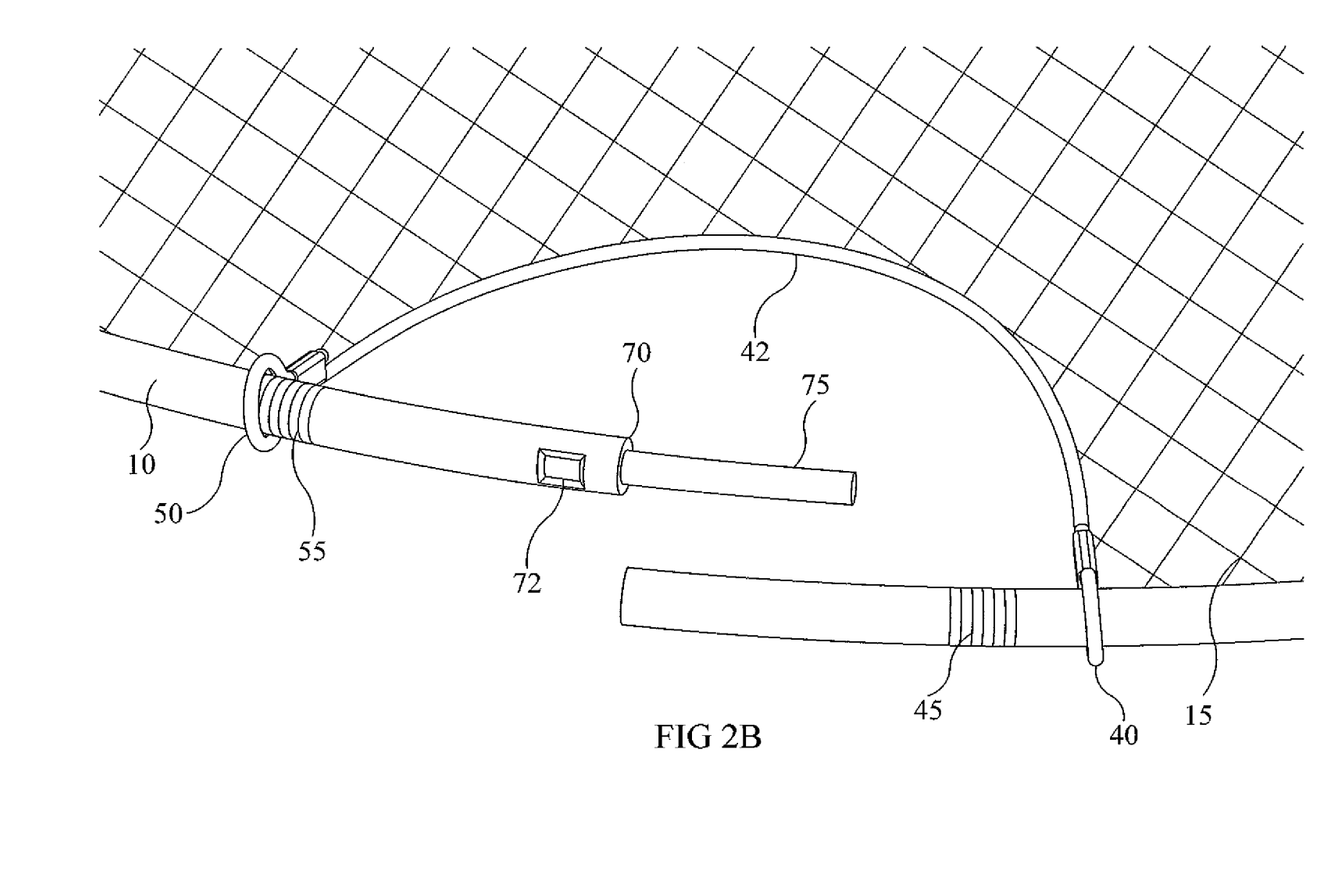
FIG. 2B is an enlarged perspective view of the partially assembled components of the present invention.

FIGS. 2A and 2B are enlarged perspective views of the partially assembled components of the hoop net 5. Both figures provide a detailed view of the point of connection 60 of the metal rods 10. When the metal rods 10 are disconnected, they reveal connection components including a hollow open first end 65 and second end 70 having an indented groove or crease 72 and a hollow pin-like extension 75. The hollow pin-like extension 75 has a smaller diameter than the second end 70 from which it extends. For reconnection, the hollow pin-like extension 75 of the second end 70 is inserted into the hollow open first end 65 and securely fastened by virtue of the dimensions of the components, creating the point of connection 60. The metal rods 10, including the first end 65, second end 70, and pin-like extension 75 are hollow and tubular in design. The dimensions of the metal rods 10, including the first end 65, second end 70, and pin-like extension 75 may vary. However, a key feature of this design is that the interior diameter of the first end 65 must be larger by a few millimeters than the outer diameter of the hollow pin-like extension 75.

Figure 3:
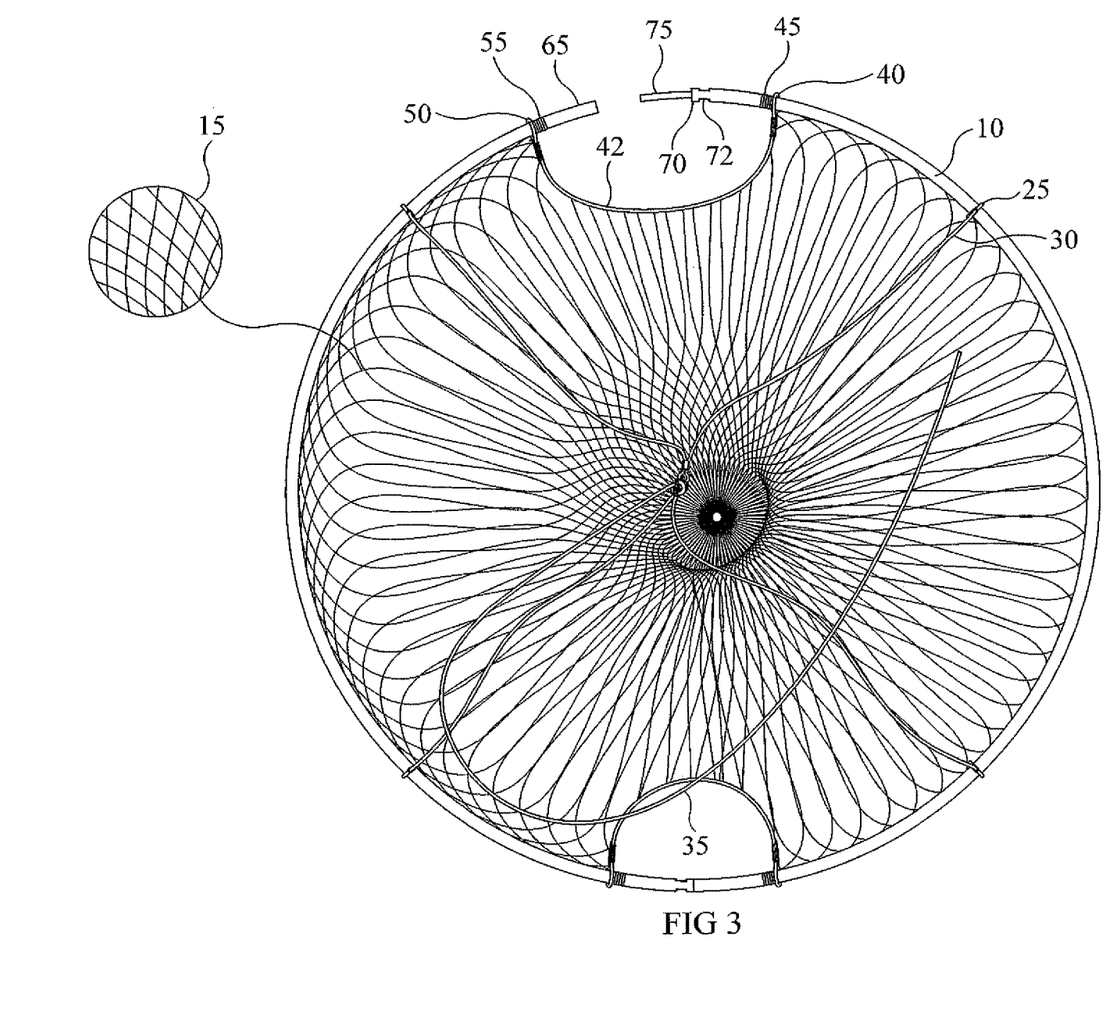
FIG. 3 is a top perspective view of the present invention illustrating both the assembled and disconnected ring component of the invention.

In one embodiment of the invention, the interior diameter of the first end 65 may be 0.8 mm and the outer diameter of the hollow pin-like extension 75 may be 0.5 mm. When connected the two components 65 and 75 fit securely together without slippage or movement until disconnected by placing a thumb or other digit over the indented groove or crease 72 of the second end 70 and pulling apart. When connected, the diameter of the circle created by the two metal rods 10 range from 4 to 6 ft. The disclosed dimensions of the connected metal rods 10 are not meant to be limiting, but illustrative and may be adjusted by one of ordinary skill in the art to which this invention belongs for optimal function. FIG. 3 is top perspective view of the present invention illustrating the disconnected metal rods 10 where the hollow pin-like extension 75 is exposed and the connected metal rods 10 showing the indented groove 72 near the point of connection 60.

Figure 4:
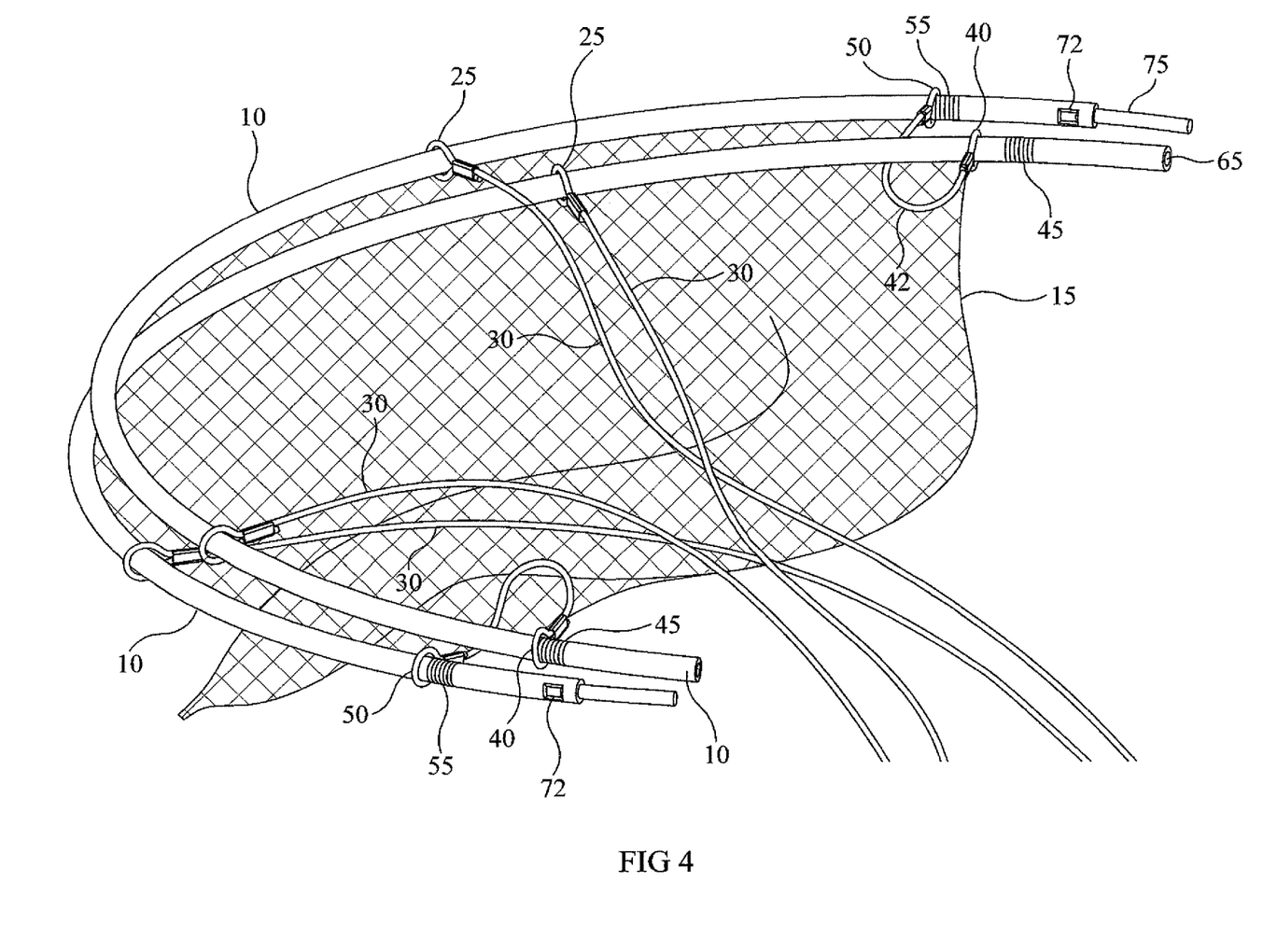
FIG. 4 illustrates the present invention collapsed and folded.

In one embodiment of the invention, the net 15 may comprise of ¼" mesh and the bottom portion 20 is made of monofilament netting; the four stabilizing cords 30 may be made of 300 lb. monofilament and are attached to the rods 10 at the equidistant points 25 by a crimp or other fastener consisting of 300 lb. monofilament which is crimped for closure around the rods 10. The term crimp or crimping should be given its ordinary meaning to compress something, to pleat, to corrugate, to crease, or create a restriction or limitation. In fishing industry terms, a crimp is a machined hollow sleeve used to make joins in monofilament and cable. The term is used herein to describe the process of compressing monofilament or nylon or rope or other cord together to form a secure closure means or reliable connection. The term is also applied to the compressing of hollow or tubular metal to form a secure closure about or a reliable connection to another material, including but not limited to the same or other metal. In this embodiment of the invention, the four stabilizing cords 30 converge to the center of the hoop net 5 and are fastened together by means of 10/0 stainless steel swivel and is further attached to the draw cord 35 which may also be made of 300 lb. monofilament that is 25 feet long and ¼" thick. In this embodiment, the U shaped cord 42 is also made of 300 lb. monofilament and components 45 and 55 consists of wax string used keep the net 15 in place about the seamless connection point(s) 60. Also in this embodiment, the first end 65 and second end 70 have an outer diameter of ⅛" and inside diameter of ¼" and is made of aluminum, while the pin-like insert 75 is 2.5" in length, made of solid stainless steel and is crimped (indicated by crease at 72) at the point of attachment to the second end 70 for a secure and reliable connection. The connection/disconnection points 60 are essential to allowing the hoop net to collapse and fold into halves for efficient storage and transport of the hoop net as illustrated in FIG. 4.

In the preferred embodiment of this invention, the net 15 is made of mesh or similar fibers woven in a diamond-like structure or lattice-like structure as shown in FIGS. 1 through 4, see inset on FIG. 3. However, in other embodiments of this invention the type of fiber used and its pattern of weaving may be altered or substituted by one of ordinary skill in the art to which this invention belongs to achieve optimal function. The metal rods 10 may be made of aluminum or other metal of similar properties known to one of ordinary skill in the art to which this invention belongs.

In other embodiments of this invention, the net 15 may comprise of materials including, but not limited to monofilament nylon, multifilament nylon, monofilament polyethylene nylon, multifilament polyethylene, knotless polyethylene netting, and/or clear twisted polyethylene. Further the net 15 may comprise of other similar nylon and/or polyethylene materials or netting. The net 15 may comprise of any material synthetically derived or manufactured to have the same or similar structure and properties similar to that of nylon and/or polyethylene.

In the preferred embodiment of this invention, the cords (30, 35, 42) described herein are made of monofilament. However, in other embodiments the cords (30, 35, 42) are not limited to this material, but may comprise of nylon or other material having the same or similar tensile strength and thickness of ordinary fishing line or other material of same or similar properties known to one of ordinary skill in the art to which this invention belongs. Further, the cords 30, 35, 42 may comprise of materials including, but not limited to monofilament nylon, multifilament nylon, monofilament polyethylene nylon, multifilament polyethylene, knotless polyethylene netting, and/or clear twisted polyethylene. The cords 30, 35, 42, may comprise of other similar nylon and/or polyethylene materials or netting. The cords 30, 35, 42, may comprise of any material synthetically derived or manufactured to have the same or similar structure, tensile strength, and other properties similar to that of monofilament and/or nylon and/or polyethylene.

In other embodiments of this invention, the hoop net 5 consists of a single tubular rod or ring that is continuous without any breaks or connection points, while maintaining its rigidity, strength and ability to withstand the rigors of catching bait. Alternatively, the hoop net 5 may comprise of a single tubular rod or ring with only one connection point, having the same mode of connection as the first end 65, second end 70, and the pin-like insert 75 as described herein. These embodiments are designed to accommodate users who do not have a problem with storage space or ease of transport, but who desire the assembly, function, and strength of the hoop net 5.

Figure 5A:
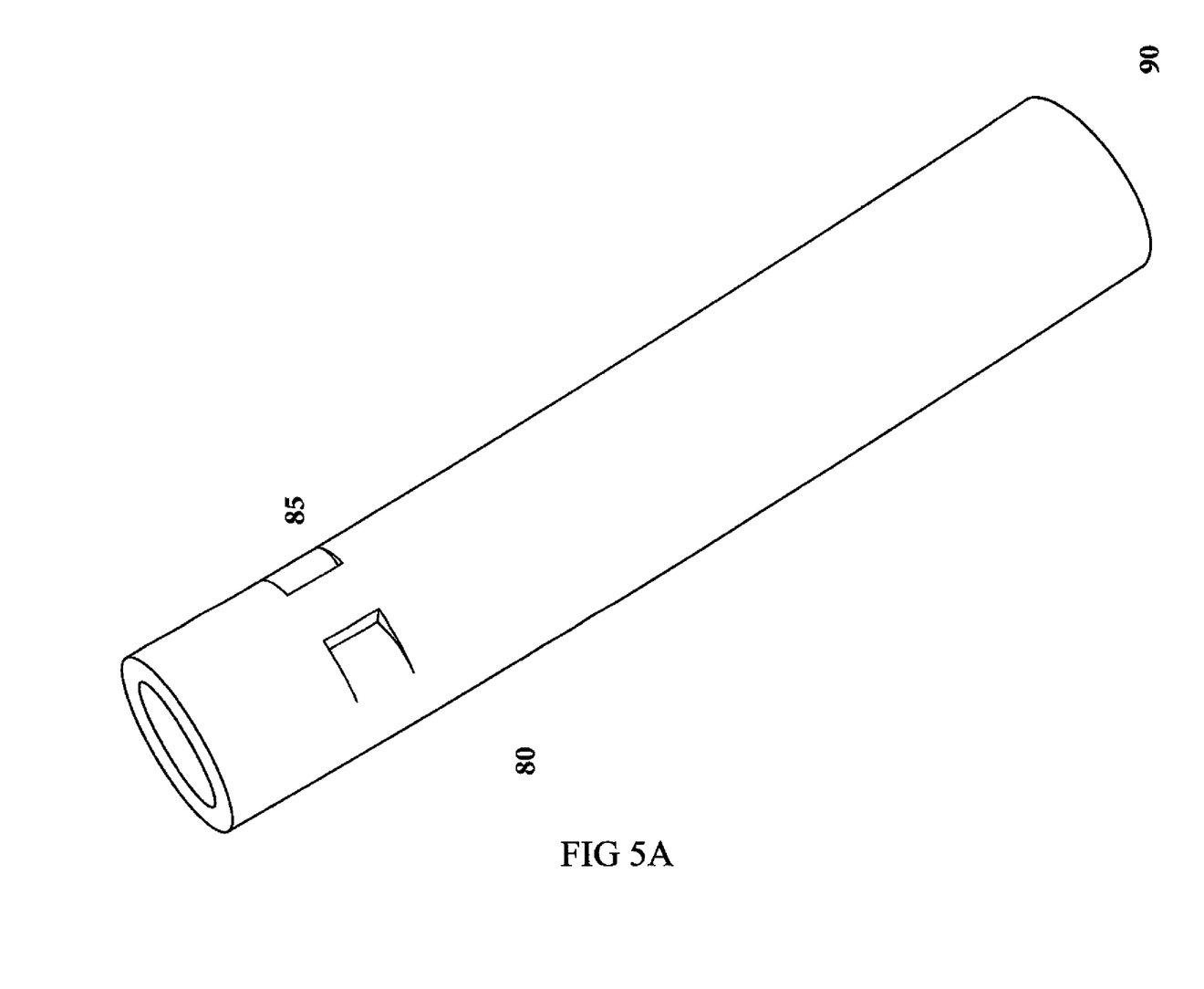
FIG. 5A is a side view of a crimped sleeve fastening means for the present invention.
Figure 5B:
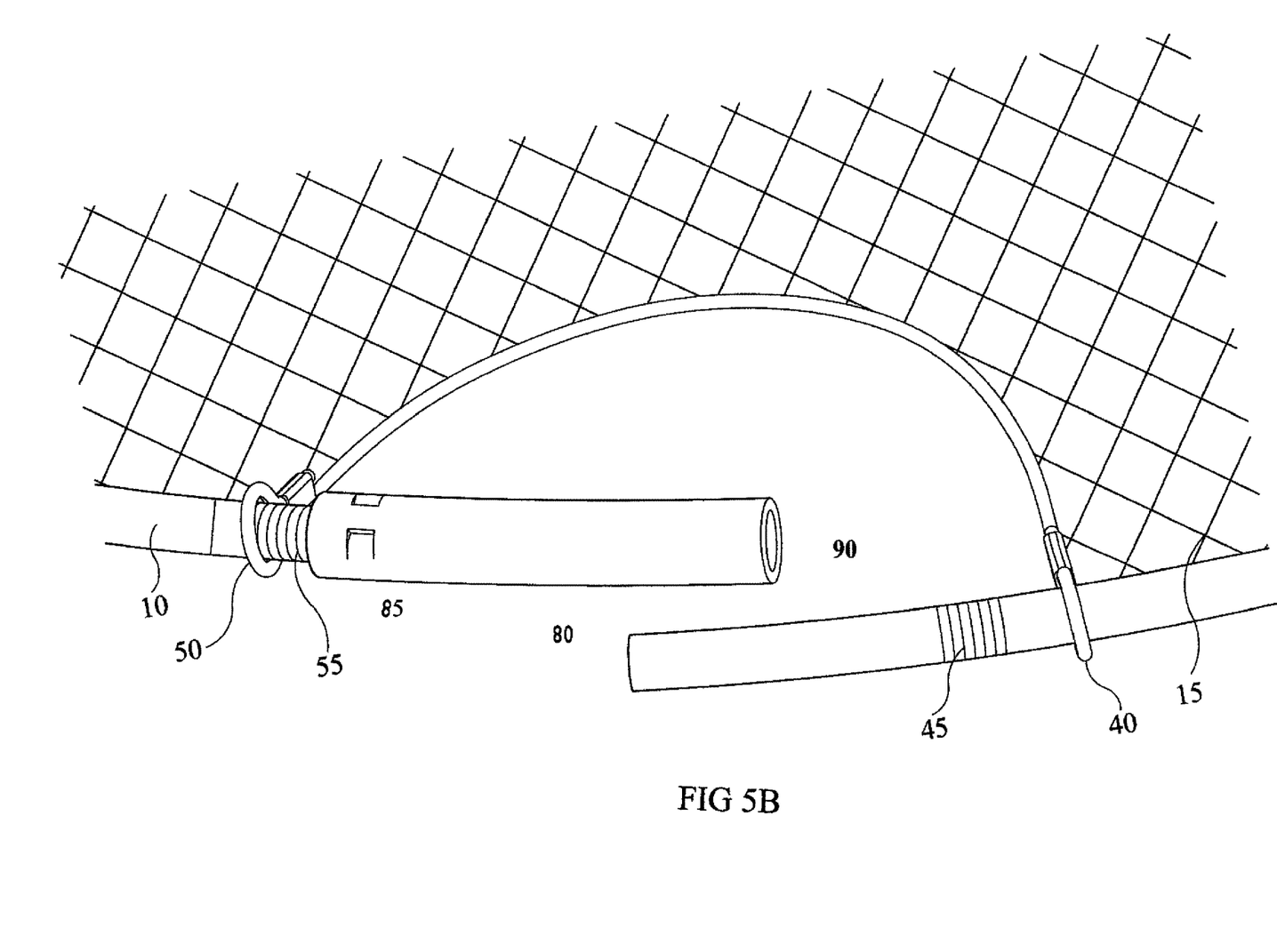
FIG. 5B is an enlarged perspective view of the partially assembled components of the present invention with the crimped sleeve fastening means.
Figure 5C:
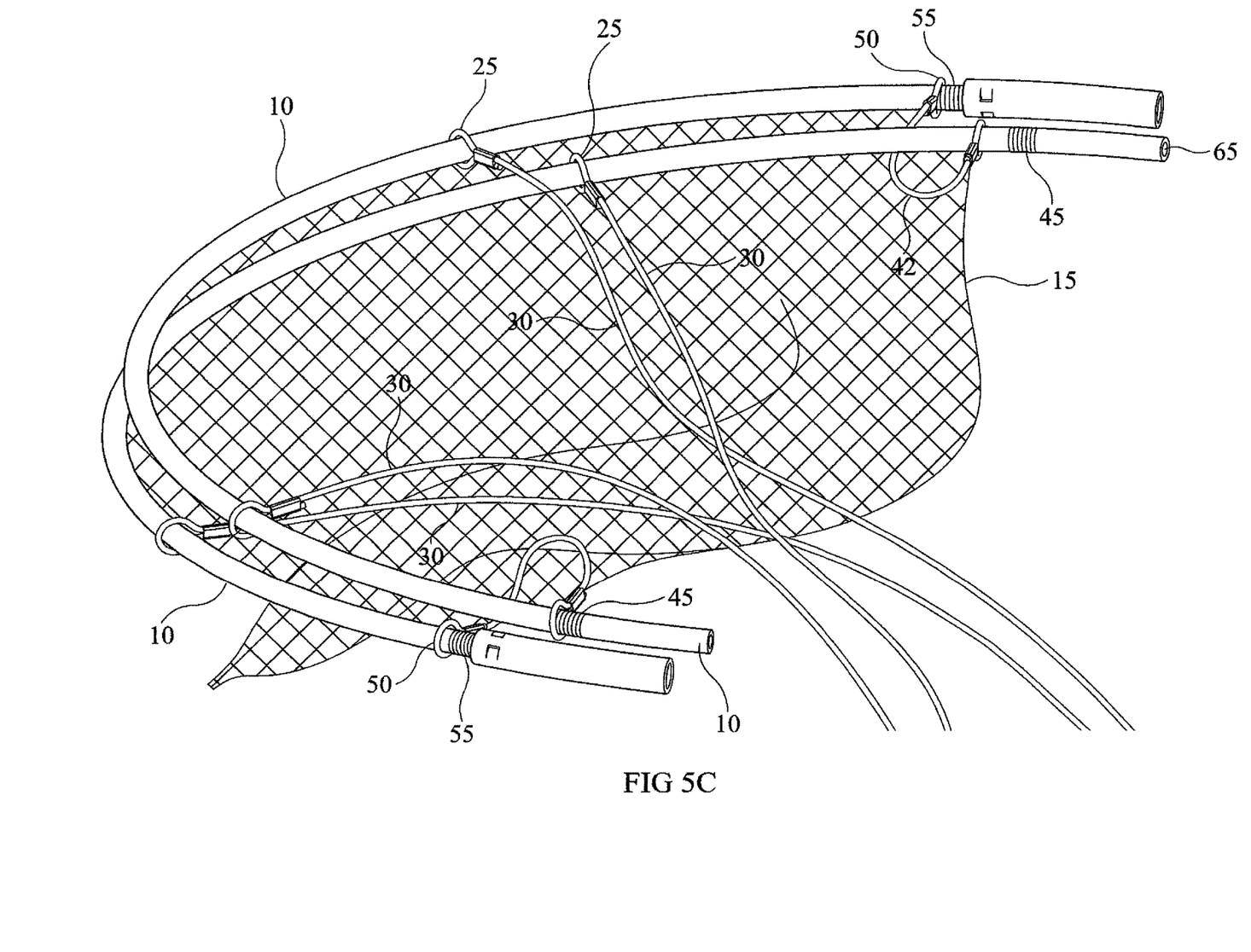
FIG. 5C is front view of the present invention in its collapsed form, showing the position of the crimped sleeve fastening means.

In other embodiments of the invention, the hoop net 5 may comprise of one or more tubular rod(s) or ring(s) made of varying materials including, but not limited to galvanized steel, stainless steel, fiberglass, steel, steel coated materials, polyethylene, polycarbonate, bamboo, or various types of wood. These materials would be fashioned to form a contiguous ring or into two or more semi-circular segments for assembly and disassembly to facilitate ease of storage and transport. As shown in FIGS. 5A, 5B, and 5C, where the hoop net 5 is comprised of two or more segments 10 made of non-metal materials, such as fiberglass, the segments 10 may be removably connected by a metal sleeve 80 or connector, comprising a crimped end 85 and a hollow non-crimped end 90. The metal sleeve 80 is removably attached to one end of each of the non-metal segments 10 by the crimped end 85, as shown in FIGS. 5B and 5C, and the non-crimped hollow end 90 is attached to the other end of the non-metal segments 10. This metal sleeve 80 or connector may be made of aluminum, steel, or a suitable metal alloy. The sleeve 80 serves as a secure yet detachable connection point for the segments 10 of the hoop net 5. As shown in FIG. 5C, the segments 10 are detached or disassembled by removing them from the non-crimped hollow end 90 of the sleeve 80, to facilitate collapsing and folding for storage and transport. Alternatively, the metal sleeve 80 or connector may be irremovably crimped to one end of each of the non-metal segments 10, allowing the end of each non-metal segment 10 that is not crimped to fit securely and permanently into the hollow opposing end 90 of the metal sleeve 80. The sleeve 80 may be of varying lengths and widths to accommodate the size and dimension of the non-metal segments 10. The length may be at least 2 inches as a shorter length could result in an unstable connection between the sleeve 80 and a non-metal segment 10.

As various changes may be made in the above-described subject matter without departing from the scope and the spirit of the invention, it is intended that all subject matter contained in the above description, or shown in the accompanying drawings, will be interpreted as descriptive and illustrative, and not in a limiting sense. Many modifications and variations of the present invention are possible in light of the above teachings. It is therefore to be understood that within the scope of the appended claims, the invention may be practiced otherwise than as specifically described.

EQUIVALENTS

Those skilled in the art will recognize, or be able to ascertain using no more than routine experimentation, many equivalents to the specific embodiments of the invention described herein. Such equivalents are intended to be encompassed by the claims.

What is claimed is:

1. A collapsible bait net comprising:
   a. two or more semicircular tubular rods, each having hollow ends;
   b. a metal sleeve having a length of at least 2 inches, having hollow ends, one of which is a point of connection for the two or more semicircular tubular rods, whereby: the first end of the metal sleeve is crimped to one of each end of a semicircular rod; and the other end of the semicircular rod is inserted into the second end of the metal sleeve that is not crimped, and the semicircular rods connected to each other by a metal sleeve form a collapsible ring; and
   c. a net made of mesh which at its top portion has the same diameter as the ring formed by the two or more semicircular tubular rods, and at its bottom portion extends into a conical shaped enclosed receptacle, forming a hoop; and
   d. the net is attached to the ring formed by the two or more semicircular tubular rods by means of: being interwoven about the circumference of the ring; and having two U shaped cords, with one about each point of connection of the ring; and each U shaped cord is fastened to the ring by a fastening means and is held in place about each point of connection by a wax string that is wrapped around the tubular rods and creates a barrier to the movement of the U shaped cords and the net; and
   e. four stabilizing cords, each separately attached to the ring by a fastening means and positioned equidistant from each other about the ring, and which cords converge at the center of the ring and net assembly; and
   f. a draw cord that is attached to the four stabilizing cords at their point of convergence by a fastening means; and
   g. the ring and net assembly is collapsible for ease of storage and transport.

2. The collapsible bait net in claim 1 whereby the two or more semicircular tubular rods are made of fiberglass and the metal sleeves are made of aluminum.

3. The collapsible bait net in claim 1 whereby the two or more semicircular tubular rods are made of polycarbonate and the metal sleeves are made of aluminum.

4. The collapsible bait net in claim 1 whereby the two or more semicircular tubular rods are made of multifilament nylon and the metal sleeves are made of aluminum.

5. The collapsible bait net in claim 1 whereby the two or more semicircular tubular rods are made of monofilament nylon and the metal sleeves are made of aluminum.

6. The collapsible bait net in claim 1 whereby the two or more semicircular tubular rods are made of galvanized steel and the metal sleeves are made of aluminum.

7. The collapsible bait net in claim 1 whereby the two or more semicircular tubular rods are made of polyethylene and the metal sleeves are made of aluminum.

8. A bait net comprising:
   a. a single tubular rod made of fiberglass, having two hollow connectible ends;

b. a metal sleeve having a length of at least 2 inches, having hollow ends, one of which is a point of connection for the two or more semicircular tubular rods, whereby: the first end of the metal sleeve is crimped to one of each end of a semicircular rod; and the other end of the semicircular rod is irremovably inserted into the second end of the metal sleeve that is not crimped, and the semicircular rods connected to each other by a metal sleeve form a non-collapsible ring; and c. a net made of mesh which at its top portion has the same diameter as the ring formed by the singular tubular rod, and at its bottom portion extends into a conical shaped enclosed receptacle, forming a hoop; and d. the net is attached to the ring formed by the singular tubular rod by means of: being interwoven about the circumference of the ring; and having two U shaped cords symmetrically positioned on opposite sides of the ring; and each U shaped cord is fastened to the ring by a fastening means and is held in place by a wax string that is wrapped around the tubular rod and creates a barrier to the movement of the U shaped cords and the net; and e. four stabilizing cords, each separately attached to the ring by a fastening means and positioned equidistant from each other about the ring, and which cords converge at the center of the ring and net assembly; and f. a draw cord that is attached to the four stabilizing cords at their point of convergence by a fastening means; and whereby g. the ring and net assembly is not collapsible.

* * * * *